United States Patent [19]

Smith

[11] Patent Number: 6,026,078
[45] Date of Patent: *Feb. 15, 2000

[54] APPARATUS AND METHOD FOR PROVIDING MULTIPLE NETWORK PORT CONFIGURATIONS

[75] Inventor: Kevin G. Smith, Austin, Tex.

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,204

[22] Filed: Feb. 5, 1997

[51] Int. Cl.$^7$ ................................................. H04L 12/40
[52] U.S. Cl. ........................... 370/258; 370/200; 370/434
[58] Field of Search .................................. 370/200, 400, 370/401, 402, 403, 404, 424, 407, 408, 425, 445, 446, 447, 434, 315, 465

[56] References Cited

U.S. PATENT DOCUMENTS

| | | | |
|---|---|---|---|
| 5,561,666 | 10/1996 | Christensen et al. | 370/276 |
| 5,574,722 | 11/1996 | Slykhouse et al. | 370/434 |
| 5,680,397 | 10/1997 | Christensen et al. | 370/434 |
| 5,687,174 | 11/1997 | Edem et al. | 370/446 |

OTHER PUBLICATIONS

ISO/IEC 8802–5 (ANSI/IEEE Std 802.5), Token ring access method and physical layer specifications, second edition, Dec. 29, 1995.

*Primary Examiner*—Chi H. Pham
*Assistant Examiner*—Frank Duong
*Attorney, Agent, or Firm*—Blakely Sokoloff Taylor & Zafman LLP

[57] ABSTRACT

A system controls the configuration of a Token Ring network port having a first mode of operation and a second mode of operation. The system includes a mode selector having a first state associated with the first mode of operation and a second state associated with the second mode of operation. A switching device is coupled to the mode selector and the network port. The switching device has a first configuration associated with the first mode of operation and a second configuration associated with the second mode of operation. The network port may include multiple signal wires that are coupled in different configurations by the switching device based on the switching device configuration. Additionally, the switching device may be coupled to receive a phantom current in the first configuration and coupled to transmit a phantom current in the second configuration. A detector can be coupled to the switching device to detect a phantom current in the first mode of operation.

12 Claims, 7 Drawing Sheets

APPARATUS AND METHOD FOR PROVIDING MULTIPLE NETWORK PORT CONFIGURATIONS

BACKGROUND OF THE INVENTION

1. Field of the Invention

The present invention relates to network devices. More specifically, the invention relates to network devices having one or more network ports capable of multiple configurations.

2. Background

Various types of network devices are available for managing, forwarding, and handling data in a network. These network devices include data terminal equipment (DTE), hubs, repeaters, network management units, and other devices capable of being coupled to a network or coupled to another network device. Network devices typically include one or more network ports for transmitting and receiving data. These network ports may be coupled directly to the network or coupled to other network devices.

A network may include multiple network devices capable of controlling other devices in the network. For example, a particular network may include several network hubs coupled to one another. In this example, each hub is capable of communicating with other hubs. Additionally, each hub is capable of communicating with and controlling other network devices coupled to the hub.

In known network devices, a particular port may be designated as either a master port or a slave port (also referred to as a controlled port). For example, a network hub may have multiple ports operating as master ports. These master ports are coupled to controlled ports in various network devices. Thus, the network hub functions to control the network devices coupled to the hub. In these known devices, the port configurations are fixed and cannot be changed without replacing or modifying the port circuitry.

Known network hubs typically have multiple ports for coupling to multiple network devices. In certain situations, a network hub may be used as a control device for multiple network devices. At the same time, the hub may receive control signals from another network device (e.g., a master device). To provide for this situation, known network hubs provide multiple ports, one or more of which are dedicated to coupling a control device. Other ports in the network hub are dedicated to coupling network devices that are controlled by the hub. Since all ports in the network hub have a dedicated configuration, a hub that is used only to control other network devices cannot utilize the ports dedicated to coupling to a control device. Therefore, the hub resources are not fully utilized because the controlled port cannot be used to couple network devices.

It is therefore desirable to provide a network port capable of being configured as either a master port or a controlled port, thereby permitting complete utilization of all network ports in a particular network device.

SUMMARY OF THE INVENTION

The present invention provides a system for controlling the configuration of a network port having multiple configurations. The multiple configurations permit a single network port to operate in different modes, thereby reducing problems associated with network ports having a fixed configuration.

An embodiment of the present invention provides a system for controlling the configuration of a Token Ring network port having a first mode of operation and a second mode of operation. The system includes a mode selector having a first state associated with the first mode of operation and a second state associated with the second mode of operation. A switching device is coupled to the mode selector and the network port. The switching device has a first configuration associated with the first mode of operation and a second configuration associated with the second mode of operation.

Another feature of the invention provides that the network port may include multiple signal wires. The switching device changes the signal wire coupling when switching between the first and second configurations.

Other aspects of the invention provide that the switching device is coupled to receive a phantom current in the first configuration and coupled to transmit a phantom current in the second configuration.

In a particular embodiment of the invention, the network port is configured as a hub in the first mode of operation and configured as a station in the second mode of operation.

Other embodiments of the invention include a detector coupled to the switching device.

One aspect of the present invention involves a method for controlling the configuration of a network port by determining the state of a mode selector and setting a switching device to configure the network port for a first mode of operation or a second mode of operation based on the status of the mode selector.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, components, and circuits have not been described in detail so as not to obscure the invention.

The present invention provides a system for enabling a network port, such as a Token Ring network port, to have multiple configurations. In various network configurations, different types of ports may be utilized in the network devices. For example, ports at opposite ends of a communication link may have different configurations, such as master and slave. The port configurations may be determined by the device type (e.g., a hub or other control device has ports configured in a first mode and network devices coupled to the hubs or control devices have ports configured in a second mode). In this type of configuration, it may be necessary to have opposite types of ports on opposite ends of each communication link. Different port types may be required to properly configure and exchange information between the ports.

In an embodiment of the invention, a particular network port may have a first configuration and a second configuration. The first configuration may be referred to as "hub mode" and the second configuration may be referred to as "station mode." In hub mode, the port acts as a port in a conventional network hub and is capable of communicating with a station or other network device. In station mode, the port acts as a port in a station or network device and is capable of communicating with a network hub or other control device. Thus, rather than providing a separate port for each possible configuration, embodiments of the invention allow one or more network ports on a device to function in multiple configurations, thereby reducing the number of unusable ports caused by improper port configurations. The invention also permits a single network device having one or more configurable network ports to operate as a network hub controlling devices coupled to the device or operate as a network station receiving instructions from a network master device.

Figure 1:
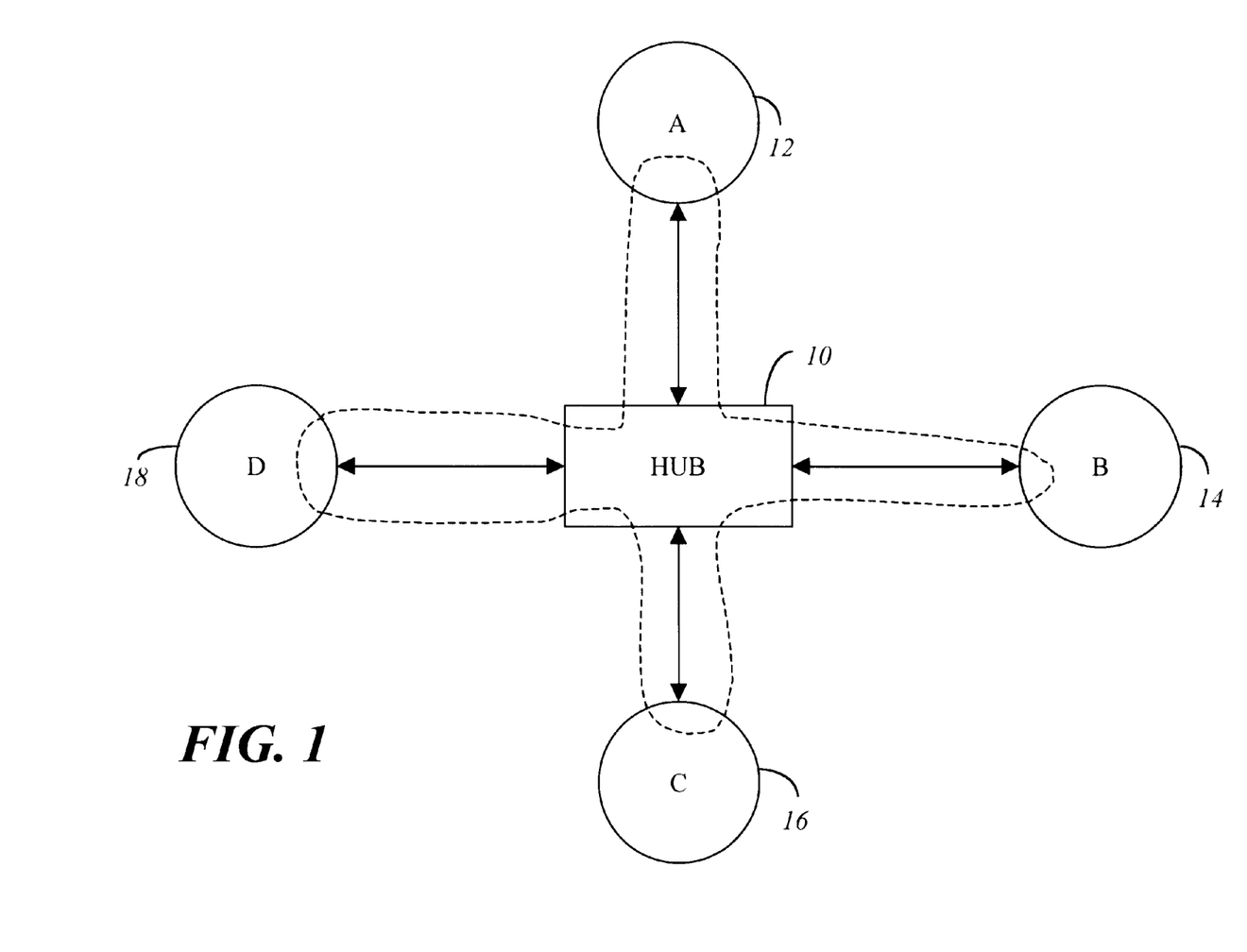
FIG. 1 illustrates an exemplary network configuration capable of utilizing the teachings of the present invention.

FIG. 1 illustrates an exemplary network configuration having a hub 10 and multiple network devices 12, 14, 16, and 18. Network devices 12–18 may also be referred to as network stations. As illustrated, each network device 12–18 is coupled to hub 10 through a communication link. In an embodiment of the invention, hub 10 may have multiple ports for communicating with multiple network devices. Each network device 12–18 may include a single port for communicating with a hub or similar network device.

Depending on the network protocol used, hub 10 may determine whether a particular network device is permitted to join the network. For example, if the network shown in FIG. 1 is a Token Ring network and hub 10 is a Token Ring hub, then the hub may control whether a particular network device is permitted to join the Token Ring. Although the configuration shown in FIG. 1 may not appear to have a ring configuration, the dashed lines illustrate the actual Token Ring connections providing a ring configuration.

In the Token Ring example discussed above, assume that network devices 12, 14, and 16 have already joined the Token Ring. If device 18 requests to join the Token Ring, an appropriate signal may be generated by device 18 and transmitted to hub 10. Hub 10 receives the request and determines whether device 18 should be permitted to join the existing Token Ring. This determination may be based on the continuity of the circuits within device 18 and the continuity of the network link connecting device 18 to hub 10. This continuity may be tested using a phantom current. The use of a phantom current will be discussed in greater detail below with respect to FIGS. 5 and 6.

Figure 2:
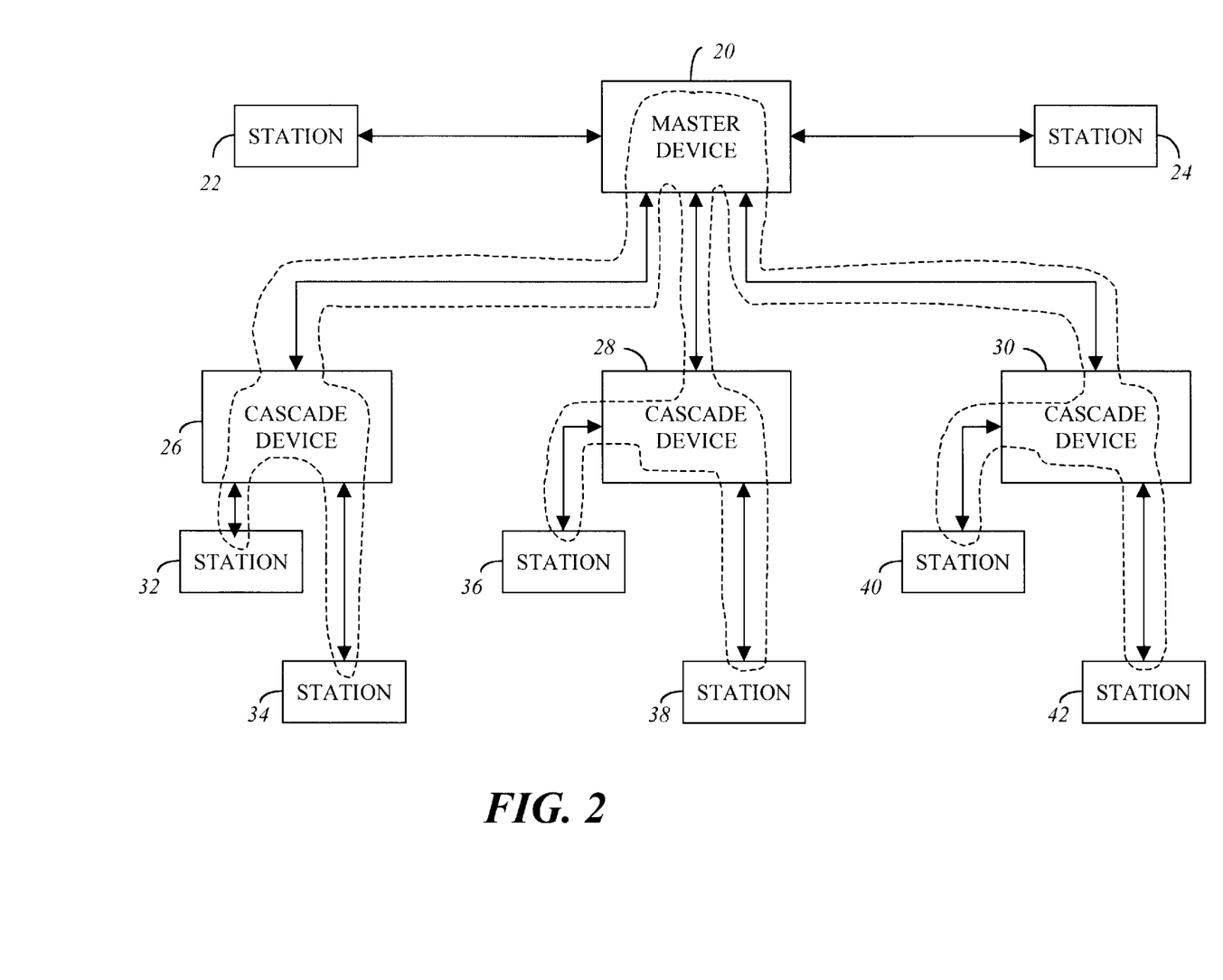
FIG. 2 illustrates another example network having a master device and several cascade devices.

FIG. 2 illustrates an example network configuration having a master device 20 coupled to three cascade devices 26, 28, and 30. Cascade devices 26–30 may also be referred to as "slave" devices. In a particular embodiment of the invention, master device 20 and cascade devices 26–30 are network hubs. Alternatively, master device 20 and cascade devices 26–30 may be any type of network device. Master device 20 issues control signals and other commands to cascade devices 26–30 to monitor and control the operation of the control devices. The dashed lines in FIG. 2 illustrate the actual Token Ring connections providing a ring configuration.

The relationship between master device 20 and cascade devices 26–30 in FIG. 2 may be treated as a hub and station configuration. For example, master device 20 may be viewed as a hub device and cascade devices 26–30 may be viewed as stations. In this example, the network ports in master device 20 may be configured in "hub mode" and the network ports in cascade devices 26–30 may be configured in "station mode."As shown in FIG. 2, stations 22 and 24 are coupled to master device 20 and, therefore, are controlled by master device 20. Stations 32 and 34 are coupled to cascade device 26 and receive control instructions from cascade device 26. Stations 36 and 38 are coupled to and controlled by cascade device 28. Stations 40 and 42 are coupled to and controlled by cascade device 30. Thus, each cascade device 26–30 may operate as a station with respect to master device 20 and act as a hub (or similar control device) with respect to the stations attached to the cascade device. The network ports in cascade devices 26–30 may be configured differently depending on whether the port is coupled to master device 20 or one of the stations 32–42. The ports coupled to master device 20 are configured in "station mode" and the ports coupled to stations 32–42 are configured in "hub mode."

Master device 20 and cascade devices 26–30 may be located in separate physical areas. For example, master device 20 may be located in a central wiring closet in a building and each cascade device 26–30 may be located in a different wiring closet in other locations of the building. Master device 20 may provide the central control for cascade devices 26–30, and each cascade device may provide localized control of the stations in the area near the cascade device. In a Token Ring environment, each cascade device 26–30 may control its local network activity by determining whether to permit a station to join the local Token Ring associated with the cascade device. Additionally, cascade devices 26–30 may monitor traffic flow on the local Token Ring and report this traffic information to master device 20.

Figure 3:
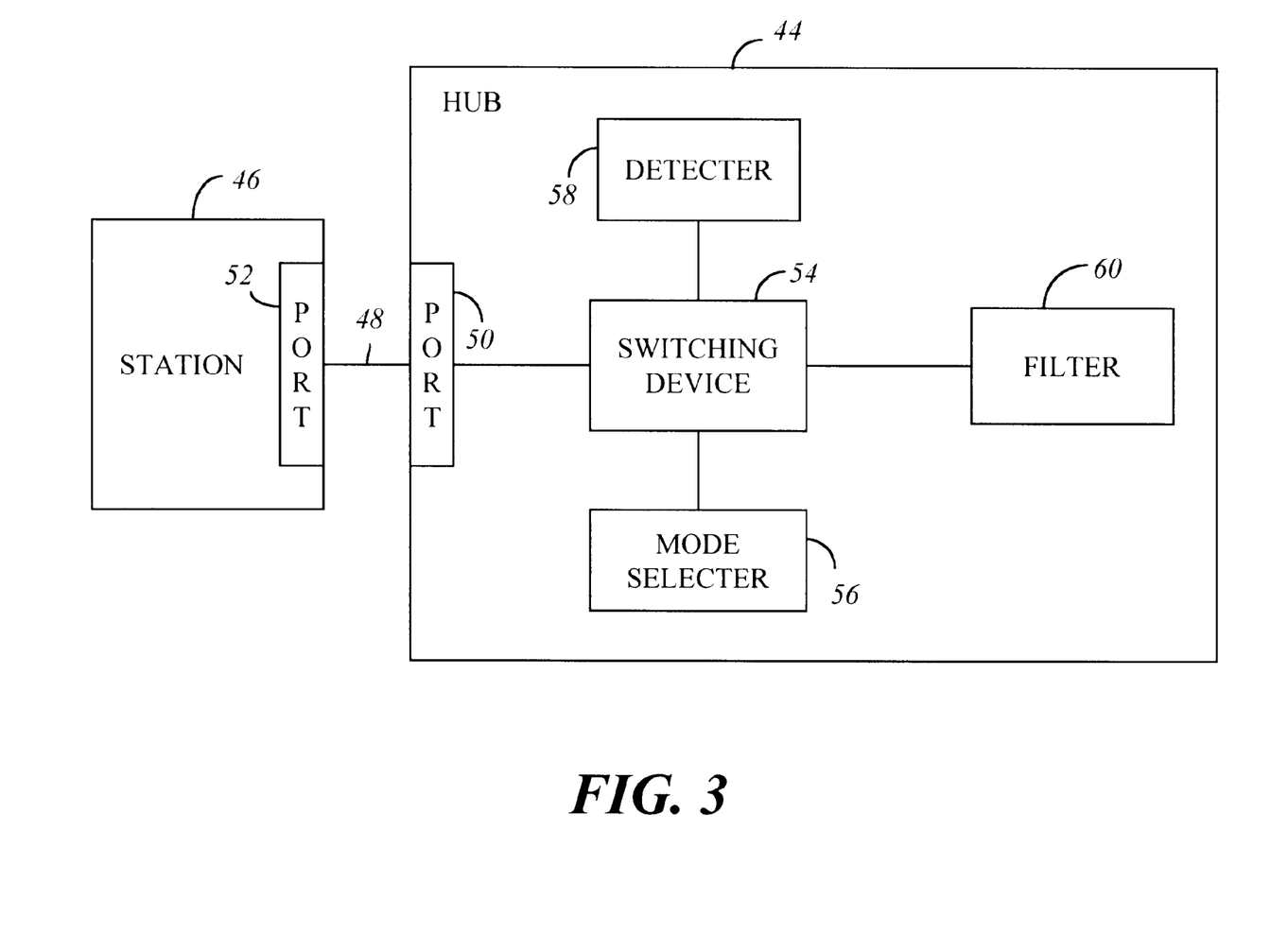
FIG. 3 illustrates a block diagram of an embodiment of a hub coupled to a station.

FIG. 3 illustrates an embodiment of a network hub 44 coupled to a network station 46. Hub 44 includes a port 50 coupled to a communication medium 48. Station 46 includes a port 52 coupled to communication medium 48. Hub 44 includes a switching device 54 coupled to port 50 and a mode selector 56 coupled to switching device 54. Switching device 54 provides the mechanism for changing port 50 between multiple configurations. Mode selector 56 determines the mode of operation of hub 44 (e.g., hub mode or station mode). Switching device 54 determines the proper port configuration based on the status of mode selector 56. Mode selector 56 may be a switch, jumper, memory register, or other device capable of selecting between multiple modes. A detector 58 is coupled to switching device 54 and used to detect a phantom current generated by station 46. Additional details regarding phantom current and detector 58 are provided below with respect to FIGS. 5 and 6. A filter 60 is coupled to switching device 54 and performs various filtering and wave-shaping functions.

Station 46 in FIG. 3 does not include a switching device and mode selector, as contained in hub 44. These systems are not required because, in this embodiment of the invention, station 46 is used only as a network station and cannot function as a network hub. Therefore, it is not necessary to provide the components to permit "hub mode" operation.

However, in alternate embodiments of the invention, station 46 may include a switching device and mode selector to permit multiple configurations of port 52.

Although a single port 50 and associated circuitry 54–60 is illustrated in hub 44, those skilled in the art will appreciate that numerous ports 50 and associated circuitry may be included in a single hub 44. For example, a particular hub may have one or more ports capable of being configured in multiple modes and one or more ports having a fixed configuration or fixed mode. Similarly, multiple ports 52 may be included in station 46. In the example of FIG. 3, hub 44 is not coupled to a master device and, therefore, is configured in "hub mode." This configuration is achieved by setting mode selector 56 to hub mode, thereby causing switching device 54 to change the port configuration accordingly.

Figure 4:
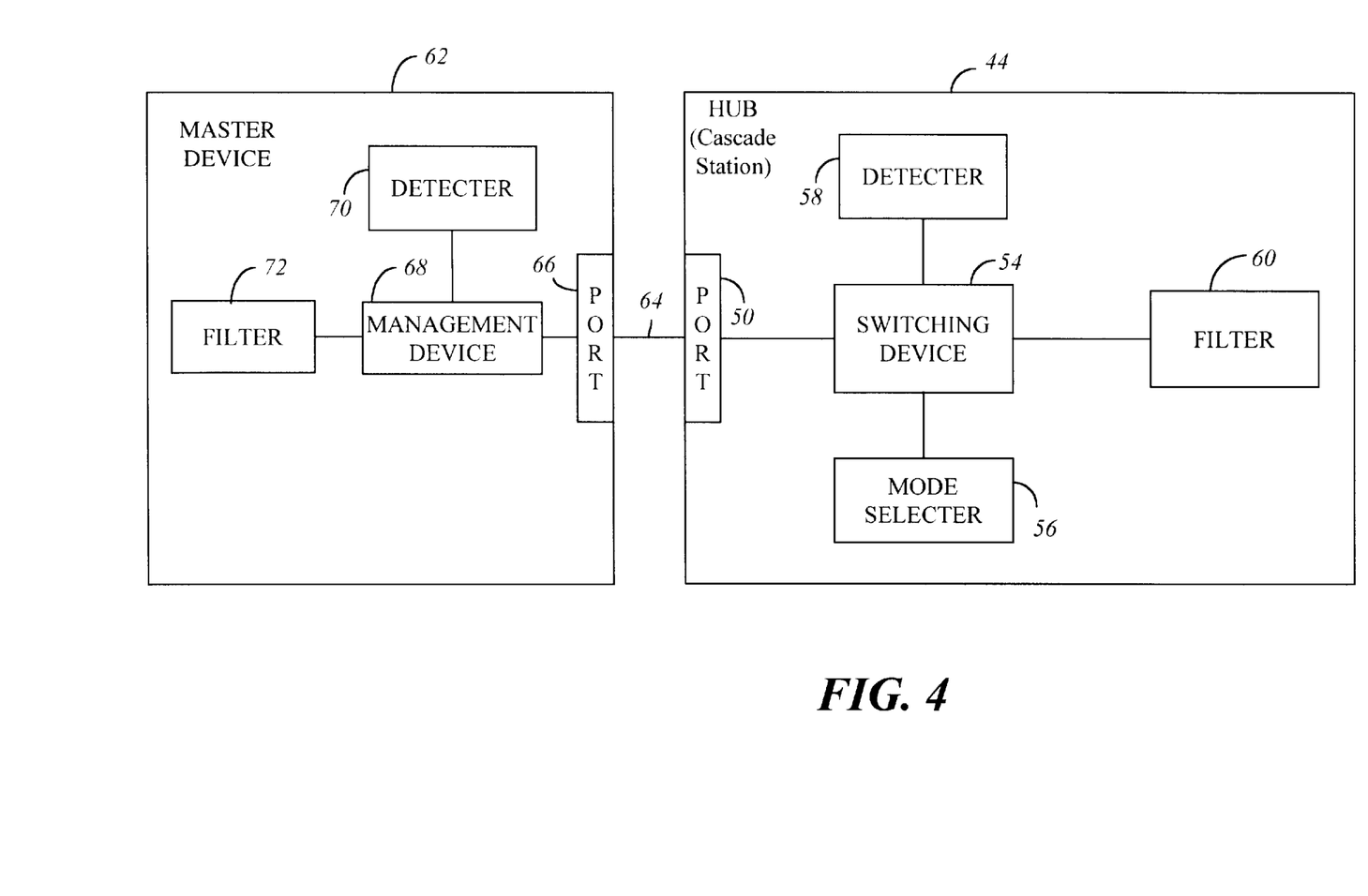
FIG. 4 illustrates a block diagram of an embodiment of a master device coupled to a hub.

FIG. 4 illustrates hub 44 when configured as a cascade station. The components and operation of hub 44 are similar to those discussed above with respect to FIG. 3. However, mode selector 56 is set to "station mode" and switching device 54 changes the port configuration to station mode. In FIG. 4, hub 44 is coupled to a master device 62 using a communication medium 64. As mentioned above, port 50 is configured in station mode to receive data and control information from master device 62.

Master device 62 includes a management device 68 coupled to port 66. Management device 68 controls the generation and transmission of control information to hub 44. Management device 68 may also receive data (e.g., traffic flow data) from hub 44 as well as other hubs coupled to master device 62. A detector 70 and a filter 72 are coupled to management device 68 and are similar to detector 58 and filter 60 described above with respect to FIG. 3.

Figure 5:
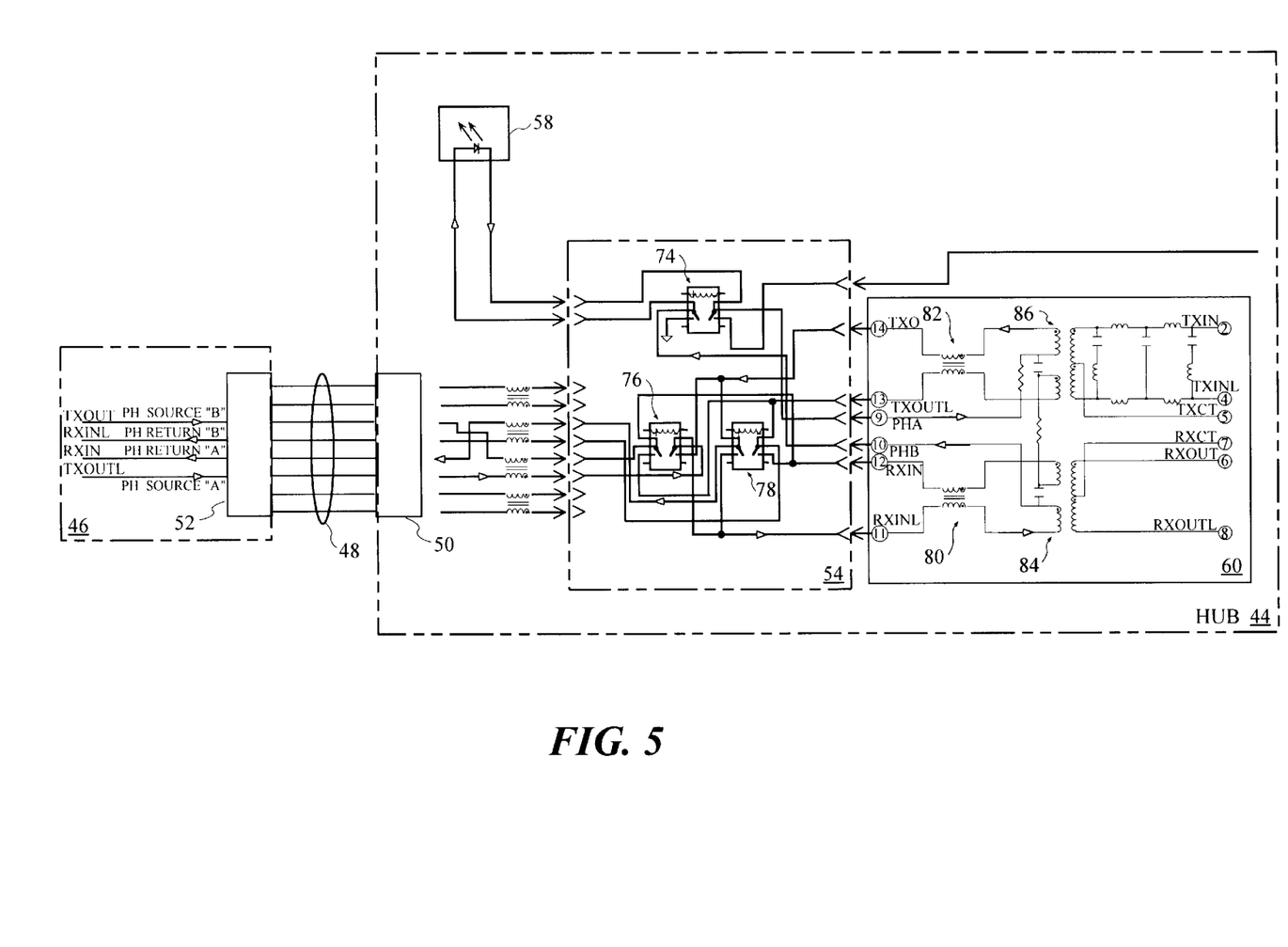
FIG. 5 illustrates an embodiment of a hub coupled to a station.

FIG. 5 illustrates in greater detail hub 44 and station 46 shown in FIG. 3. Detector 58 is an optodetector including a diode that emits light in response to a DC current. A photo-sensitive transistor in optodetector 58 changes state (i.e., begins conducting) when light is detected. Switching device 54 includes three relays 74, 76, and 78. Relays 74–78 are used to change the pin configurations of port 50 based on the particular mode selected. Additionally, relays 74–78 change the path of the phantom current based on the mode selected. Additional details regarding the circuit changes performed by relays 74–78 and the operation of filter 60 are provided below. Various types of switching mechanisms or selection mechanisms may be utilized to select a particular mode for a network port.

In an embodiment of the invention, hub 44 shown in FIG. 5 is a Token Ring hub operating in hub mode. Hub 44 may receive a request from station 46 to join the Token Ring. This request is generated by station 46 in the form of a phantom current that is transmitted through port 52 to port 50. The phantom current is indicated by the hollow arrowheads on the signal lines. The phantom current propagates through relays 74–78, transformers 80, 82, 84, and 86, and through optodetector 58. If optodetector 58 conducts, it indicates that station 46 wants to join the Token Ring. The phantom current is generated by a DC signal that is transparent to AC signal data propagating along the same conductors.

Figure 6:
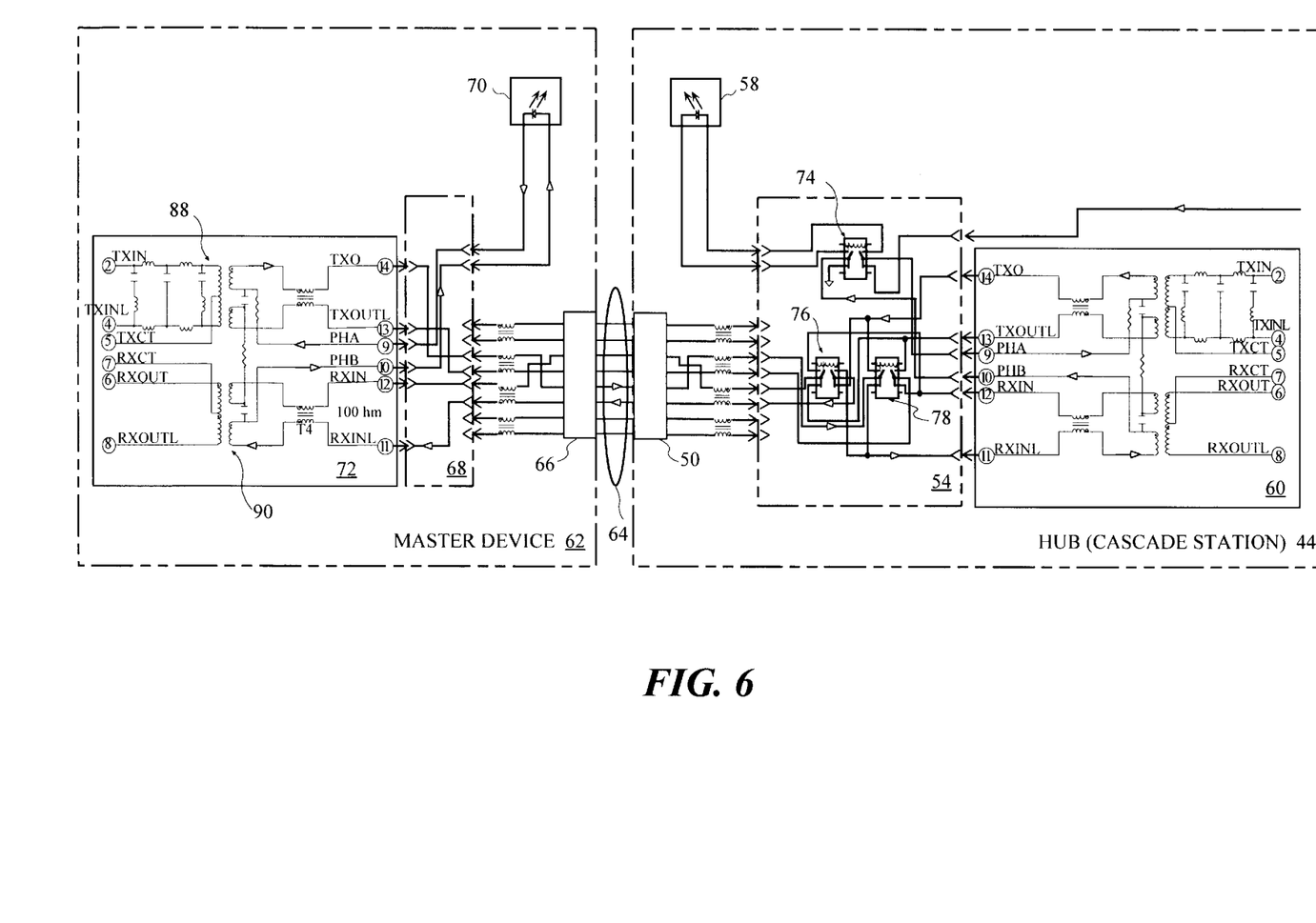
FIG. 6 illustrates an embodiment of a master device coupled to a hub.

FIG. 6 illustrates in greater detail hub 44 and master device 62 shown in FIG. 4. The circuit components and interconnections are similar to those discussed above with respect to FIG. 5. However, since the mode of operation has changed from hub mode to station mode, relays 74, 76, and 78 have changed state as shown. In the example of FIG. 6, hub 44 generates the phantom current to indicate a request to connect with master device 62. Since hub 44 is generating the phantom current, optodetector 58 is not utilized. Instead, optodetector 70 in master device 62 detects the phantom current generated by hub 44.

Figure 7:
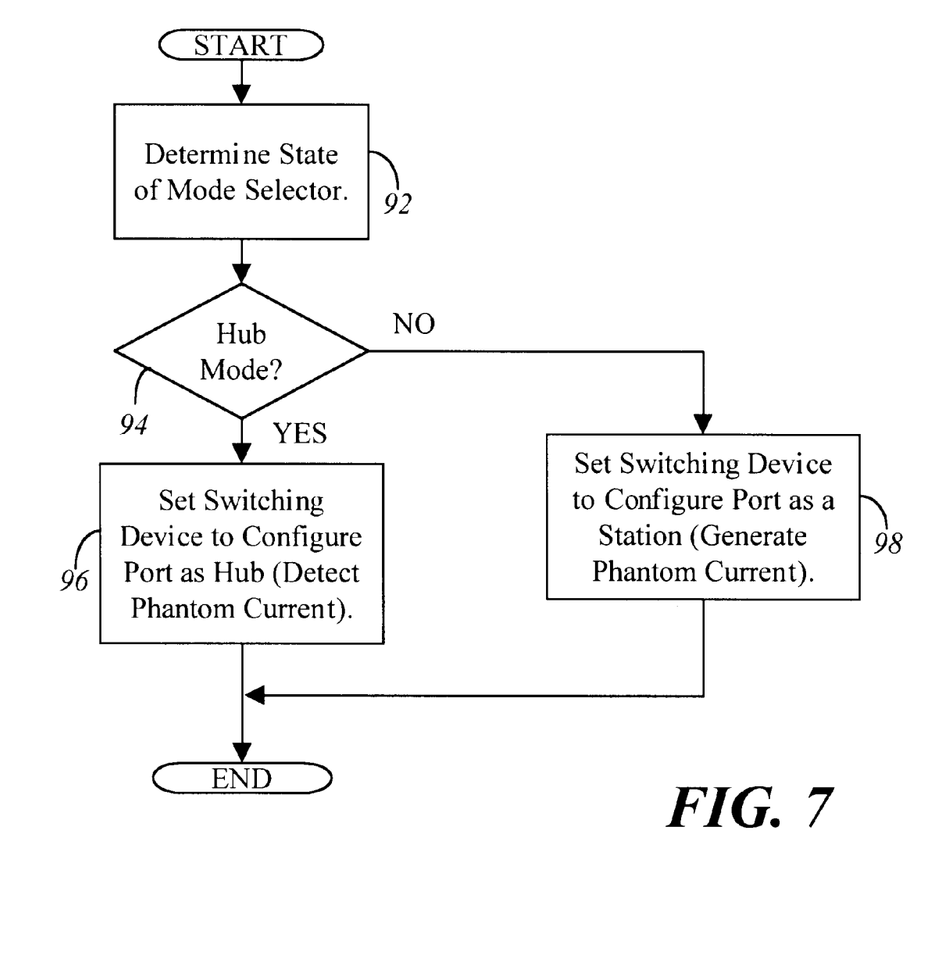
FIG. 7 is a flow diagram illustrating an embodiment of a procedure used to configure a port as a hub or a station.

FIG. 7 is a flow diagram illustrating an embodiment of a procedure used to configure a port as a hub or a station. At step 92 the procedure determines the state of the mode selector (e.g., hub mode or station mode). If hub mode is selected, then step 94 branches to step 96 to set the switching device to configure the port as a hub. In this example, the port is configured to receive a phantom current from a station coupled to the port. If hub mode is not selected, then step 94 branches to step 98 to set the switching device to configure the port as a station. In this example, the port is configured to transmit a phantom current to a master device coupled to the port.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. An apparatus for controlling a configuration of a Token Ring network port having a first mode of operation and a second mode of operation, comprising:
   an optodetector;
   a switching device coupled to the network port, the switching device including
      a first relay coupled to the optodetector, and
      a second and third relays coupled to the network port, the second and third relays to alter the network port with a first configuration when associated with a first mode of operation and with a second configuration when associated with a second mode of operation;
   a filter coupled to the first, second and third relays of the switching device; and
   a mode selector to control the second and third relays by placing the relays into the first configuration when the first mode of operation is selected and the second configuration when the second mode of operation is selected.

2. The apparatus of claim 1 wherein the network port includes a plurality of signal wires and the switching device changes the signal wire coupling when switching between the first and second configurations.

3. The apparatus of claim 1 wherein the switching device is coupled to receive a phantom current in the first configuration and coupled to transmit a phantom current in the second configuration.

4. The apparatus of claim 1 wherein the network port is configured as a hub in the first mode of operation.

5. The apparatus of claim 1 wherein the network port is configured as a station in the second mode of operation.

6. The apparatus of claim 1 wherein the detector is coupled to detect a phantom current in the first mode of operation.

7. The apparatus of claim 1 wherein the detector is disabled in the second mode of operation.

8. The apparatus of claim 1 wherein the apparatus is contained in a switching system product.

9. The apparatus of claim 1 wherein the apparatus is contained in a transmission system product.

10. An apparatus for controlling a configuration of a Token Ring network port having a first mode of operation and a second mode of operation, comprising:

means for detecting and identifying an incoming phantom current;

means for filtering the incoming phantom current; and means for switching a pin configuration of the network port between a first mode of operation when receiving a phantom current and a second mode of operation when transmitting the phantom current, the switching means including a first relay to provide the phantom current to the detecting and identifying means, and a second relay and a third relay coupled to the network port, the second and third relays to alter the pin configuration of the network port by placing the network port in a first configuration when associated with the first mode of operation and in a second configuration when associated with the second mode of operation.

11. The apparatus of claim 10 wherein the apparatus is contained in a switching system product.

12. The apparatus of claim 10 wherein the apparatus is contained in a transmission system product.

* * * * *